United States Patent
Li et al.

(10) Patent No.: US 9,423,716 B2
(45) Date of Patent: Aug. 23, 2016

(54) CHARGE ROLLER

(75) Inventors: Shao-Wei Li, San Diego, CA (US); Yi Feng, San Diego, CA (US); Stanley J. Kozmiski, Escondido, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 66 days.

(21) Appl. No.: 14/375,047

(22) PCT Filed: Mar. 1, 2012

(86) PCT No.: PCT/US2012/027194
§ 371 (c)(1),
(2), (4) Date: Jul. 28, 2014

(87) PCT Pub. No.: WO2013/130083
PCT Pub. Date: Sep. 6, 2013

(65) Prior Publication Data
US 2015/0018181 A1    Jan. 15, 2015

(51) Int. Cl.
| | |
|---|---|
| *B05C 1/08* | (2006.01) |
| *G03G 15/02* | (2006.01) |
| *H01B 1/12* | (2006.01) |
| *B05D 5/12* | (2006.01) |
| *F16C 13/00* | (2006.01) |
| *H01B 1/20* | (2006.01) |
| *G03G 15/10* | (2006.01) |

(52) U.S. Cl.
CPC ............ *G03G 15/0216* (2013.01); *F16C 13/00* (2013.01); *G03G 15/0233* (2013.01); *H01B 1/20* (2013.01); *G03G 15/10* (2013.01)

(58) Field of Classification Search
CPC .......... G03G 15/0216; G03G 15/0233; G03G 15/10; C08G 18/10; C08G 18/40; C08G 18/4018; C08K 5/19; C08L 75/04; F16C 13/00; H01B 1/20; B05D 1/00
USPC ........... 399/176; 492/53; 252/519.21; 427/58
See application file for complete search history.

(56) References Cited

U.S. PATENT DOCUMENTS

| | | |
|---|---|---|
| 5,823,929 A | 10/1998 | Kavolius et al. |
| 6,352,771 B1 | 3/2002 | Chiang et al. |
| 6,778,799 B2 | 8/2004 | Shin et al. |
| 7,609,999 B2 | 10/2009 | Gila et al. |
| 2002/0111259 A1 | 8/2002 | Chiang et al. |
| 2005/0202946 A1* | 9/2005 | Hattori et al. .................. 492/56 |
| 2006/0020100 A1* | 1/2006 | Lee et al. ........................ 528/44 |
| 2007/0088146 A1* | 4/2007 | Nakamura et al. ............. 528/44 |
| 2008/0146427 A1 | 6/2008 | Osaku |
| 2009/0274487 A1 | 11/2009 | Nakamura et al. |
| 2011/0170909 A1 | 7/2011 | Garcia |
| 2011/0274469 A1 | 11/2011 | Chiang |

(Continued)

FOREIGN PATENT DOCUMENTS

| | | |
|---|---|---|
| CN | 101178559 | 5/2008 |
| JP | 2004271709 | 9/2004 |

(Continued)

*Primary Examiner* — Thao T Tran
(74) *Attorney, Agent, or Firm* — HP Inc. Patent Department (57) ABSTRACT

The present disclosure discloses a new charge roller particularly but not exclusively for charging a photoconductive element in a liquid electro-photograph (LEP) image-forming apparatus. The charge roller includes a cured composition of an aromatic diisocyanate, a polycarbonate polyester polyol, a matte agent, a surface energy modifier, and a conductive agent.

18 Claims, 2 Drawing Sheets

(56) References Cited

U.S. PATENT DOCUMENTS

2012/0134714 A1* 5/2012 Takeuchi et al. .............. 399/176
2012/0141162 A1* 6/2012 Mayuzumi et al. ........... 399/111

FOREIGN PATENT DOCUMENTS

| | | |
|---|---|---|
| JP | 2011-053658 | 3/2011 |
| WO | WO 2011/016099 | 2/2011 |

* cited by examiner

CHARGE ROLLER

BACKGROUND

A liquid electro-photograph (LEP) process begins with charging a photo-conductor. Scorotron devices are commonly used to impart electrons on the photo-conductor for the charging purpose. A drawback of scorotron devices resides in the environmentally dangerous ozone emission generated by the corona effect. A known alternative to scorotron devices are charge rollers. The present disclosure generally relates to a new charge roller, an apparatus particularly for performing a liquid electro-photograph (LEP) process and a method for the manufacture of the charge roller.

DETAILED DESCRIPTION

Charge rollers typically comprise a conductive (usually steel) shaft core which is at least partially coated with a layer of a conductive rubber. In certain cases, it is advantageous that the layer be further coated. The coating can contribute to tailor roller surface electric and/or mechanical and/or physical properties and its purpose is typically three folds. First, it provides a protective layer that inhibits contaminants from adhering to the roller surface. Secondly, it serves as a mechanical and chemical barrier that protects the conductive rubber from physical damage and chemical deterioration. Lastly, having a conductivity which is lower than the conductivity of the coated rubber layer, the coating provides uniform charge and prevents arcing when in contact with the photoconductor.

The presence of a coating is for example advantageous in case of charge rollers comprising a hydrin rubber layer. Hydrins (i.e. terpolymers of epichlorohydrin/ethylene oxide/allyl glycidyl ether) exist in different chemical grades, each grade containing different amounts of the constitutive monomers blend and having specific physical and mechanical properties. In certain applications, such as high speed LEP printing processes, hydrins may be doped with carbon black. The presence of carbon black on roller surface is unwanted as it can cause arcing on the photo-conductor. Additionally, hydrins have a relatively high surface energy which tends to attract contaminates in the air during roller handling or in the press when in use.

The presence of a coating is also advantageous in case of charge rollers for performing a LEP printing process. The basic LEP printing process involves using a DC or AC charged charge roller to place a uniform electrostatic charge on a photoconductor, the photoconductive surface on a rotating drum for example, and exposing the photoconductor to light in the pattern of the desired printed image to dissipate the charge on the areas of the photoconductor exposed to the light. The resulting latent electrostatic image on the photoconductor is developed by applying a thin layer of liquid toner to the photoconductor. Liquid toner generally consists of charged toner particles dispersed in a carrier liquid (typically a hydrocarbon oil such as Isopar-L®, CAS No. 64742-48-9 available from Exxon Mobile). Below, the carrier liquid is also referred to as image oil or ink solvent. Therefore, and unlike other electro photographic printing applications, such as laser printer, charge rollers used in the LEP printing are in direct contact with image oil and this can trigger deterioration of the roller and lead to an unsatisfactory life span.

When used in demanding conditions, such as LEP printing process and/or charge rollers comprising a hydrin rubber layer, polyurethane-based prior art coating compositions were not found to be always satisfactory in meeting the requirements indicated above, particularly but not exclusively in terms of charge roller surface properties.

Figure 1:
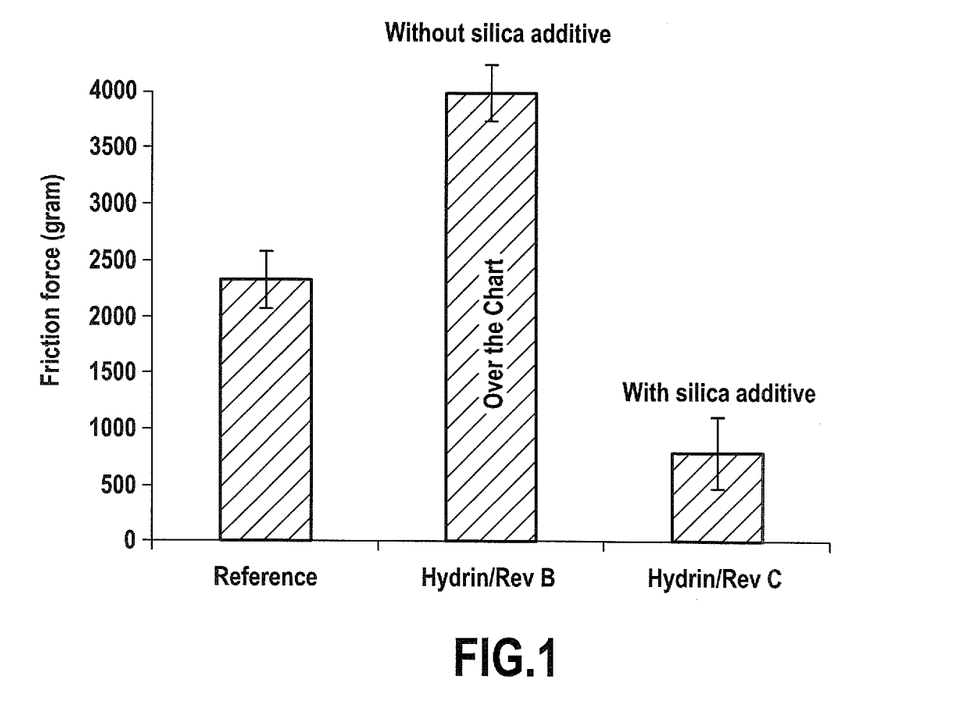
FIG. 1 compares the performances of three charge rollers in a test to measure friction force. The reference sample (comparative) is a commercial coated polyurethane charge roller, sample B is a charge roller comprising a hydrin-based conductive layer coated with a polyurethane-based rubber obtained according to an embodiment of the present disclosure in which no matte agent was added, sample C comprises a hydrin-based conductive layer coated with a rubber in which a silica-containing matte agent was added (about 6% by weight over weight of total solids)
Figure 2:
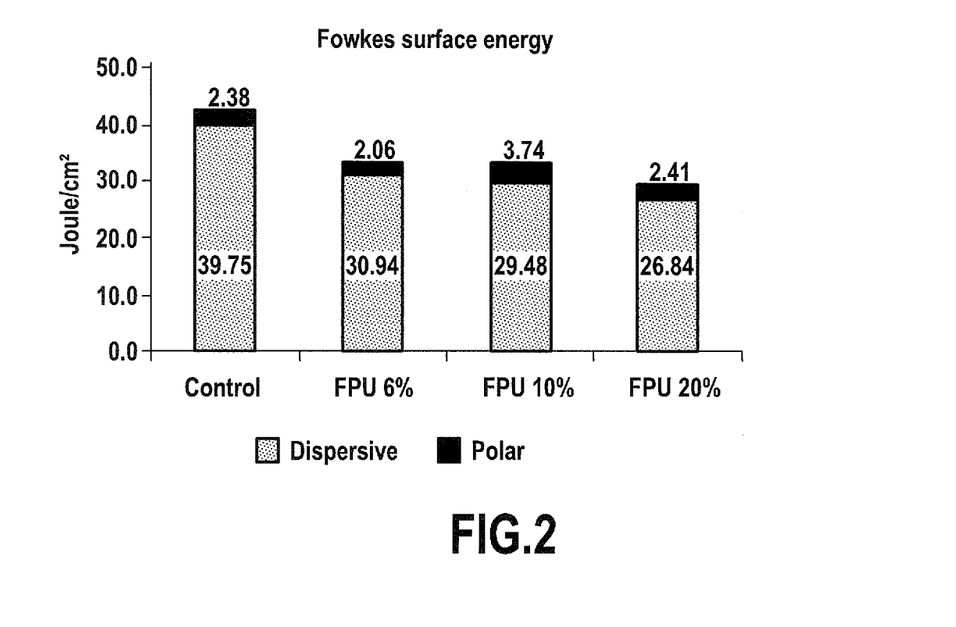
FIG. 2 compares the performances of four charge rollers in a test to measure surface energy. The reference sample (comparative) does not contain any surface energy modifier, sample A comprises a coating in which NRL Fluoropolyol® 6% by weight over the weight of diisocyanate and polyol was added, sample B comprises a coating in which NRL Fluoropolyol® 10% by weight over the weight of diisocyanate and polyol was added, sample C comprises a coating in which NRL Fluoropolyol® 20% by weight over the weight of diisocyanate and polyol was added. "Dispersive" means surface energy due to dispersive interactions, "polar" means surface energy due to polar interaction.
Figure 3:
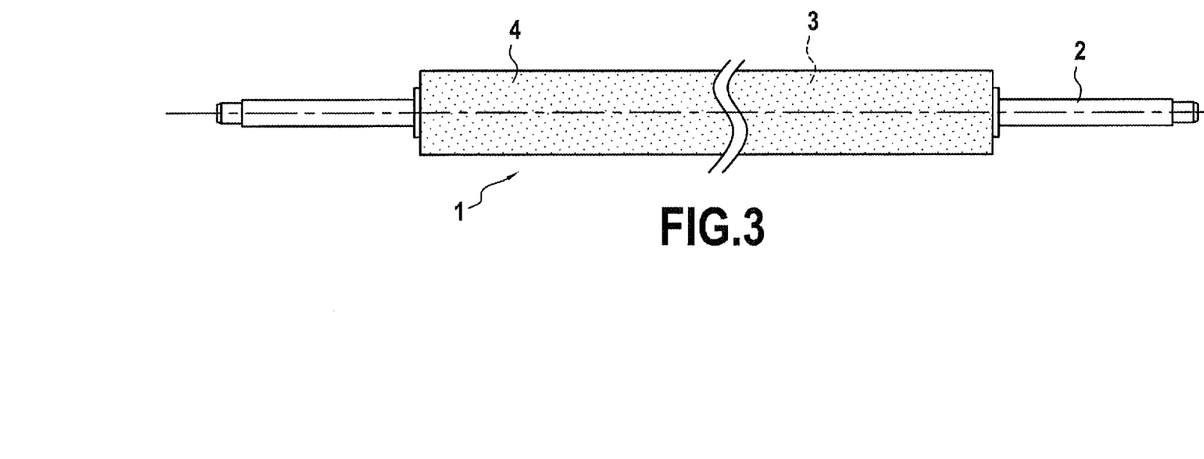
FIG. 3 is a view of a charge roller according to an embodiment of the invention.

Structural elements of a typical charge roller are represented in FIG. 3. Referring to this figure, a charge roller 1 comprises an inner conductive shaft 2 (which may comprise an internal cavity) typically made of steel or aluminum, and a conductive layer 3 of a rubber disposed about said shaft 2 and extending along at least a portion of the length of said shaft. The layer 3 has an outer longitudinal surface which is further coated with a usually semi-conductive rubber coating 4. The conductivity of the rubber used for the coating 4 is typically lower than the conductivity of the rubber used for the layer 3. This is a solution to overcome unwanted arcing of the charge roller when in contact with the photo-conductor.

Unless otherwise indicated, when used herein LEP or liquid electro-photograph process means a printing process which uses liquid toner to form images on paper or other print medium. LEP is often used for large scale commercial printing. The basic LEP printing process involves using a DC or AC charged charge roller to place an uniform electrostatic charge on a photoconductor, the photoconductive surface on a rotating drum for example, and exposing the photoconductor to light in the pattern of the desired printed image to dissipate the charge on the areas of the photoconductor exposed to the light. The resulting latent electrostatic image on the photoconductor is developed by applying a thin layer of liquid toner to the photoconductor. Liquid toner generally consists of charged toner particles dispersed in a carrier liquid (typically a hydrocarbon oil such as Isopar-L®, CAS No. 64742-48-9 available from Exxon Mobile). Below, the carrier liquid is also referred to as image oil or ink solvent. The charged toner particles adhere to the discharged areas on the photoconductor (discharged area development DAD) or to the charged areas (charged area development CAD), depending on the charge of the toner particles, to form the desired toner image on the photoconductor. The toner image is transferred from the photoconductor to an intermediate transfer member and then from the intermediate transfer member to the paper or other print medium.

In one aspect, the present disclosure discloses a charge roller comprising a rubber, said rubber being obtainable by curing a first composition comprising:
an aromatic diisocyanate,
a polycarbonate polyester polyol,
a matte agent,
a surface energy modifier, and
a conductive agent.

In one other aspect, the present disclosure discloses a charge roller comprising a coating, said coating comprising a rubber which is obtainable by curing a first composition comprising:
a polymeric 4,4'-methylene diphenyl diisocyanate,
a linear aliphatic polycarbonate polyester polyol which is obtainable from a mixture comprising 1,6-hexanediol and ε-caprolactone, said polyol having an equivalent weight of about 2000 and an hydroxyl value of about 1.7% w/w as measured with DIN 53 240/2,
a surface-treated silica,
a fluorinated polyol, and
a conductive agent.

Unless otherwise indicated, the combined weight of the aromatic diisocyanate, the polycarbonate polyester polyol, the matte agent, the surface energy modifier and the conductive agent will be referred to as weight of total solids.

Diisocyanates are molecules containing two isocyanate (—N=C=O) groups per molecule. Aromatic diisocyanates typically have general formula R—(N=C=O)$_2$, wherein R comprises an optionally substituted aromatic group, for example an optionally substituted phenyl, whereas in aliphatic diisocyanates R is an aliphatic group. Unless otherwise indicated, the terms "aromatic diisocyanate" and "aliphatic diisocyanate" as presently used as well as the specific examples thereof, must be understood to comprise diisocyanate monomers, polymers and mixtures thereof. An example of a suitable aromatic diisocyanate is an aromatic polymeric isocyanate based on MDI, i.e. 4,4'-methylene diphenyl diisocyanate. Hereinafter, this polymer (CAS No. 9016-87-9) will also be more simply referred to as polymeric MDI or pMDI. This polymer is commercially available as Mondur® MR Light from Bayer. Chemically speaking, this product is a mixture of polymer MDI (typically between about 50% and 60% by weight), monomer MDI (typically between about 35% and 45% by weight) and traces (typically less than about 7% by weight, e.g. less than 5% by weight) of 2,4'-methylene diphenyl diisocyanate. It has an NCO content (expressed as weight %) comprised between about 31.0 and 32.50, and an equivalent average weight of about 132 (data available from Bayer). It is advantageous that an aromatic diisocyanate comprises, or consists of, polymeric MDI or mixtures thereof. In one embodiment, the first composition as presently defined does not comprise aliphatic diisocyanates. In another embodiment, 4,4'-methylene diphenyl diisocyanate or a polymer thereof comprises at least 50% by weight, for example at least 60%, or at least 70% or at least 80% or at least 90% or at least 95% by weight over the weight of all diisocyanates present in the first composition.

Polyols are molecules having two or more hydroxyl (—OH) groups per molecule. Polyols may be used to form hydroxylated polymers. These polymers, also known as polymer polyols, typically contain bridging groups formed during the polymerization. Examples of bridging groups are ether bridges (—O—), ester bridges (—C(O)—O—) and carbonate groups (—O—C(O)—O—). In certain cases, the same polymer may contain combinations of these bridging groups. Unless otherwise indicated, as presently used the language "polycarbonate polyester polyol" or "polycarbonate polyol", is interchangeably used and refers to a polymer polyol comprising carbonate bridges, for example a polymer polyol comprising both ester and carbonate bridges. By contrast, "polyether polyol" or "polyester polyol" refer to polymer polyols which do not comprise carbonate bridges. Polycarbonate polyester polyols are obtainable by mixtures comprising a lactone and a polyol (e.g. a diol).

It was found that when polyester polyols are used, such as in the present case, to obtain polyurethanes (PU), the resulting PU may more frequently suffer with hydrolysis issues due e.g. to ambient humidity. The hydrolytic reaction may degrade PU rubber mechanical and other properties. Consequently, charge rollers comprising a PU rubber based on polyester polyols may have a certain life limitation and possibly show an increased risk of printing quality failure. A higher-than-desired cost-per-page (Cpp) may therefore be associated with their use. It is thus advantageous that a first composition as presently defined does not comprise polyester polyols.

It was also found that polycarbonate polyols are preferred since PU obtained by using them showed higher tear strength and lower image oil uptake with respect to a PU obtained by using polyether polyols. In one embodiment, a polycarbonate polyester polyol comprises, at least 50% by weight, for example at least 55%, or at least 60%, or about 70% by weight over the weight of all polyols in the first composition.

An example of a polycarbonate polyol is a linear aliphatic polycarbonate polyester polyol which is obtainable by reacting a mixture comprising 1,6-hexanediol and ε-caprolactone. This polyol has an equivalent weight of about 2000 and a hydroxyl value of about 1.7% w/w as measured with DIN 53 240/2. It is commercially available e.g. from Bayer as Desmophen® C1200. Other polycarbonate polyols were tested and proved to be less advantageous than Desmophen® C1200. For example, Desmophen® C1100 (a linear aliphatic polycarbonate polyester polyol which is obtainable by reacting a mixture comprising 1,6-hexanediol and ε-caprolactone, having an equivalent weight of about 1000 and a hydroxyl value of about 3.3% w/w as measured with DIN 53 240/2) led to a rubber whose hardness was less satisfactory. It is advantageous that Desmophen® C1200 be the only polycarbonate polyester polyol present in a first composition as presently defined.

In a first composition as presently defined, it is advantageous that the aromatic diisocyanate and the polycarbonate polyester polyol are present in mutual amounts which give a isocyanate-to-hydroxyl equivalent ratio (NCO index) comprised between about 1 and 1.5, for example about 1.3.

Without wanting to be bound by any theory, it is believed that the addition of a matte agent led to the achievement of a reduced physical friction and a matte appearance of the roller. In particular, charge rollers coated with a rubber as presently defined appeared to be matte with measured gloss about 3 to 5 units at an 80 degree light angle. It was found that black matte appearance is in favour of customer's perception and attracts fewer particles from the air during charge roller handling.

In a first composition as presently defined, it is advantageous that the matte agent comprises, or substantially consists of a silica-containing matte agent. Silica is in effect inert to image oils such as Isopar®-L and is also stable under electric charges.

An example of silica-containing matte agent is surface-treated silica. Surface-treated silica may be wax surface-treated silica and/or siloxane surface-treated silica. An example of wax surface-treated silica is wax surface-treated fumed silica having an average volume particle size ($d_{50}$ measured using laser diffraction according to method ISO 13320-1) comprised between about 4.4 and 5 microns. This product is commercially available as Acematt® 607 from Evonik industries.

In one embodiment, the matte agent is present in a first composition in an amount comprised between about 4% and 10%, preferably about 6% by weight based on the weight of total solids.

Without wanting to be bound by any theory, it is believed that the addition of a surface energy modifier led to the achievement of a reduced surface friction force and a lower surface energy of the charge roller.

In a first composition as presently defined, it is advantageous that the surface energy modifier comprises, or substantially consists of a fluorinated polyol. Fluorinated polyols are a known class of epoxy-functionalized fluorinated polyols. Methods of synthesis of fluorinated polyols are also known. Fluorinated polyols suitable for the present purposes are obtainable inter alia by reacting (i.e. polymerizing) a diglycidyl ether-functionalized diol (hereinafter also "diglycidyl ether") with a fluorinated diol. The diglycidyl ether in turn, is obtainable by reacting an aromatic or aliphatic diol (which in the present disclosure is preferably a fluorinated diol) with an epoxy-containing monomer, e.g. an epihalohydrin, such as epichlorohydrin. Use of a fluorinated polyol is advantageous since it can react with the aromatic diisocyanate during the curing of a first composition as presently defined thereby being chemically anchored to the PU rubber.

An advantageous example of fluorinated polyol is a co-polymer which is obtainable by reacting 1,3-bis(1,1,1,3,3,3-hexafluoro-2-hydroxypropyl)benzene with 1H,1H,5H,5H-perfluoro-1,5-pentanediol diglycidyl ether. The copolymer is commercially available e.g. from Exfluor Research Corporation as Naval Research Laboratory (NRL) Fluoropolyol which is a 70% w/w solution of the co-polymer in methyl isobutyl ketone.

In one embodiment, the surface energy modifier is present in a first composition in an amount comprised between about 3% and 10%, preferably about 5.5% by weight based on the weight of total solids.

In one embodiment, a combination of a polycarbonate polyester polyol and a fluorinated polyol, both as defined above, comprises at least 50% by weight, for example at least 60%, or at least 70%, or at least 80%, or at least 90%, or at least 95% by weight, for example is about 100% by weight over the weight of all polyols (including polymer polyols) present in the first composition.

In a first composition as presently defined, a conductive agent comprises a lithium salt and/or a quaternary alkyl ammonium salt. Although both agents are effective in reducing polyurethane resistivity, and without wanting to be bound by any theory, it has been found that lithium salts are more effective than the quaternary amines so that a lower amount of lithium salts is needed to achieve the same conductivity target. For example, it has experimentally been found that about 3 phr (per hundred rubber, expressed as parts by weight of quaternary amine per 100 combined parts by weight of aromatic diisocyanate and polycarbonate polyester polyol) quaternary amine is needed to achieve the same conductivity achieved with about 1 phr lithium salt.

An advantageous example of lithium salt is lithium bis (trifluoromethanesulfonyl)imide (e.g. HQ-115 Fluorad® commercially available from 3M®). In one embodiment, it is thus preferred that a conductive agent comprises, or substantially consists of a lithium salt, for example lithium bis(trifluoromethanesulfonyl)imide.

In one embodiment, a lithium salt is present in a first composition in an amount comprised between about 1 and 3, preferably about 1, expressed as parts by weight of lithium salt per 100 combined parts by weight of aromatic diisocyanate and polycarbonate polyester polyol (phr).

It is advantageous that the electrical performances of a rubber which is obtainable by curing a first composition as presently disclosed be as follows: for a cured rubber specimen having 2.15 cm width, 2.20 cm length and 0.045 cm thickness, the rubber resistivity is comprised between about 4.56E+5 KOhm-cm and 2.02E+5 KOhm-cm, preferably is about 4.56E+5 KOhm-cm, when stabilized at 50% relative humidity and 23° C. with an electrical source of 100 voltage. This resistivity range falls within the ranges usually acknowledged for semiconductive rubbers.

The curing of a first composition as presently defined leads to a compounded polyurethane rubber, wherein the polyurethane is formed by a reaction between the aromatic diisocyanate and the polycarbonate polyester polyol. It has been found that this rubber can advantageously be used for the manufacture of a coating for charge rollers.

Accordingly, in one aspect, the present disclosure discloses a charge roller comprising a coating, said coating comprising a rubber which is obtainable by curing a first composition as presently defined. For example, the coating has thickness comprised between about 4 and 8, preferably about 6 microns.

In one embodiment, a charge roller as presently disclosed comprises an inner conductive shaft, a layer comprising a conductive rubber, said layer being disposed about said shaft and extending along at least a portion of the length of said shaft, said layer further having an outer longitudinal surface and said outer surface being provided with a coating as defined above.

According to an advantageous example, the conductive rubber may be a rubber which is obtainable by curing a second composition comprising:
a terpolymer of epichlorohydrin/ethylene oxide/allyl glycidyl ether,
a lithium salt and
carbon black,
wherein said conductive rubber has an impendence at 8 KHz comprised between about 10 and 20 KΩ and a DC resistance comprised between about 30 and 50 KΩ when both impendence and resistance are measured by using an electrode of 323 mm long and 2 mm wide and an electrical source of 100V, in a rubber stabilized at 50% relative humidity and 23° C.

An example of suitable terpolymer is a terpolymer having an epichlorohydrin content which results in a terpolymer
  chlorine content comprised between about 18 and 20% by weight over the weight of the terpolymer, an allyl glycidyl ether content comprised between about 6.2 and 8.2% by weight over the weight of the terpolymer, the balance being ethylene oxide, and
a Mooney viscosity comprised between about 40 and 54 when expressed as $M_L$ (1'+4') and measured using ASTM D-1646 method.

This hydrin grade is commercially available as HYDRIN T3108; from Nippon Zeon Co., Ltd. Besides the above mentioned characteristics, this grade is also technically known (based on information available from manufacturer) to have a particularly high content of ethylene oxide which is about 64 mol %.

It is advantageous that a terpolymer in a second composition as presently defined comprises, or consists of this specific hydrin grade.

The lithium salt in a second composition can be any lithium salt conventionally used as ionic conducting agent for reducing resistivity of rubbers into which it is present. When used as conducting agents in a second composition as presently defined, lithium salts provided superior results over other salts such as quaternary ammonium salts (e.g. trimethyl-1-octylammonium bromide or ammonium sulfate alkyl chain salts). Accordingly, in one example the second composition does not comprise a quaternary ammonium salt, such as an alkyl quaternary ammonium salt. An example of lithium salt to be used in a second composition as presently defined is lithium(bis)trifluoromethanesulfonimide (e.g. HQ-115 Fluorad® commercially available from 3M®). This salt provided superior results when compared to other lithium salts, such as lithium perchlorate. Accordingly, in one example the lithium salt in a second composition as presently defined comprises, or consists of, lithium(bis)trifluoromethanesulfonimide.

In a second composition as presently defined, a lithium salt may be present in an amount comprised between about 1 and 4, preferably about 1.5, expressed as weight parts per 100 weight parts of said terpolymer.

Carbon black can be any carbon black conventionally used as electron conducting agent for optimising impedance of the rubber into which it is present. An example of suitable carbon black is EC300 Black commercially available from Akzo Nobel.

In a second composition as presently defined, carbon black may be present in an amount comprised between about 1 and 4, preferably about 3, expressed as weight parts per 100 weight parts of said terpolymer.

According to the advantageous example, the conductive rubber may also be a rubber which is obtainable by curing a second composition comprising:
a terpolymer of epichlorohydrin/ethylene oxide/allyl glycidyl ether which has:
 an epichlorohydrin content which results in a terpolymer chlorine content comprised between about 18 and 20% by weight over the weight of the terpolymer, an allyl glycidyl ether content comprised between about 6.2 and 8.2% by weight over the weight of the terpolymer, the balance being ethylene oxide, and
 a Mooney viscosity comprised between about 40 and 54 when expressed as $M_L$ (1'+4') and measured using ASTM D-1646 method
lithium(bis)trifluoromethanesulfonimide, and
carbon black,
wherein the amount of lithium(bis)trifluoromethanesulfonimide in the composition is comprised between about 1 and 4 expressed as weight parts per 100 weight parts of said terpolymer and wherein the amount of carbon black in the composition is comprised between about 1 and 4 expressed as weight parts per 100 weight parts of said terpolymer.

It is advantageous that the electrical performances of a conductive rubber which is obtainable by curing a second composition as presently disclosed be as follows:
 impendence at 8 KHz comprised between about 10 and 20 KΩ and
 DC (direct current) resistance comprised between about 30 and 50 KΩ when impendence and resistance are measured by using an electrode of 323 mm long and 2 mm wide and an electrical source of 100V, in a rubber roller stabilized at 50% relative humidity and 23° C.

Preferably, a rubber or a rubber roller is stabilized upon storage for at least 48 hours at 50% relative humidity and 23° C.

It is advantageous that a second composition as presently defined further comprises a sulfur donor, a curing activator and a curing accelerator. In one example:
the sulphur donor comprises, or consists of, a dispersion of about 70% w/w 4,4'-dithiodimorholine in a polymer-based binder, preferably in bead form;
the curing activator comprises, or consists of,
 zinc oxide in powder form and
 stearic acid, and
the curing accelerator comprises, or consists of,
 2,2'-dithiobis(benzothiazole),
 tetramethylthiuram monosulfide and
 a dispersion of about 75% w/w of zinc dimethylthiocarbamate in a polymer-based binder, preferably in bead form.

A suitable sulphur donor in bead form is commercially available as PB(DMDS)-75 from RheinChemie. A suitable zinc oxide in powder form is commercially available as zinc oxide grade AZ066 from U.S. Zinc. A suitable 2,2'-dithiobis(benzothiazole) is commercially available as MBTS powder from Akrochem. A suitable tetramethylthiuram monosulfide is commercially available as TMTM powder from Akrochem. A suitable dispersion of 75% w/w of zinc dimethylthiocarbamate in a polymer-based binder in bead form is commercially available as PB(ZDMC)-75 from RheinChemie.

In one embodiment, the conductive rubber is obtainable by curing a second composition comprising, or consisting of:
a terpolymer of epichlorohydrin/ethylene oxide/allyl glycidyl ether which has an epichlorohydrin content which results in a terpolymer chlorine content comprised between about 18 and 20% w/w, an allyl glycidyl ether content comprised between about 6.2 and 8.2% w/w, the balance being ethylene oxide, and a Mooney viscosity comprised between about 40 and 54 when expressed as $M_L$ (1'+4') and measured using ASTM D-1646 method;
stearic acid in an amount of about 0.5 weight parts per 100 terpolymer weight parts;
zinc oxide in powder form in an amount of about 3 weight parts per 100 terpolymer weight parts;
a dispersion of about 75% w/w of zinc dimethylthiocarbamate in a polymer-based binder, in an amount of about 1.2 weight parts per 100 terpolymer weight parts;
tetramethylthiuram monosulfide in an amount of about 0.4 weight parts per 100 terpolymer weight parts;
dithiobis(benzothiazole) in an amount of about 1 weight parts per 100 terpolymer weight parts;
a dispersion in the form of beads of about 70% w/w 4,4'-dithiodimorholine in a polymer-based binder, in an amount of about 1.75 weight parts per 100 terpolymer weight parts;
lithium(bis)trifluoromethanesulfonimide in an amount of about 1.5 weight parts per 100 terpolymer weight parts, and
carbon black in an amount of about 3 weight parts per 100 terpolymer weight parts.

A combination of a layer of a conductive rubber which is further coated with a coating, both as defined above, provides several advantages when it is used to manufacture a charge roller particularly for performing a LEP process. These advantages are readily apparent when reference is made to the typical properties of charge rollers comprising said combination:
 i) electrical performances (measured by using an electrode of 323 mm long and 2 mm wide and an electrical source of 100V, in a charge roller stabilized at 50% relative humidity and 23° C.): impendence at 8 KHz comprised between about 15 and 30 KΩ, preferably about 22 KΩ, and DC (direct current) resistance comprised between about 100 and 400 KΩ;

ii) Hydrolytical stability: no gelation issues when tested in a LEP-simulated press iii) Surface energy (measured using the Sessile drop technique): about 33 Joules/cm$^2$ iv) Friction force between the roller surface and a piece of photo-conductive layer (measured using a warp angle friction test developed in-house with a Instron test speed at 500 mm/min): about 800 grams v) Surface roughness (Ra value measured using a Carl Zeiss Axio CSM 700 Confocal Microscope): <2 micron vi) Hardness (Shore-A measured using ASTM D-2240): between about 35 and 45, preferably 40 vii) Gloss (measured at 80 degrees light angle using instrument: Novo-Curve, Manufacturer: Rhopoint Instruments Ltd.; Serial Number: SC10050018; Product Code: 61277-530): about 3 to 5 gloss units.

In one other aspect, the present disclosure discloses an apparatus for forming an image through a liquid electrophotograph process, said apparatus comprising a charge roller as defined above and a photoconductor (such as a photoconductive-layer on a drum).

In one embodiment, the apparatus further comprises a toner cartridge. In this case, it is preferred that a charge roller as presently defined be used as a physically separated and independently replaceable maintenance with respect to the toner cartridge.

In one embodiment, the apparatus further comprises charging means configured to supply said charging roller with AC voltage.

In one other aspect, the present disclosure discloses a method for the manufacture of a charge roller, said method comprising the step of curing a first composition as defined above, and wherein said curing comprises subjecting said first composition to a temperature comprised between about 70 and 130° C., preferably about 120° C., for a time comprised between about 30 min and 2 hours, preferably about 1 hour.

In one embodiment, the method comprises the steps of:
a) providing an inner conductive shaft and a layer comprising a conductive rubber, said layer being disposed about said shaft and extending along at least a portion of the length of said shaft, said layer further having an outer longitudinal surface,
b) applying onto said outer longitudinal surface a first composition as defined above, and
c) curing the first composition applied in step b) thereby obtaining a charge roller.

In one embodiment, the method comprises the steps of:
a1) providing a second composition as defined above,
a2) molding the second composition into a mold wherein a conductive shaft has been pre-installed,
a3) curing the molded second composition to a temperature comprised between about 140 and 160° C., preferably about 150° C., for a time comprised between 5 and 10 hours, preferably not more than 9 hours thereby obtaining an inner conductive shaft and a layer disposed about said shaft and extending along at least a portion of the length of said shaft, said layer further having an outer longitudinal surface,
b1) dissolving a first composition as defined above in a solvent thereby obtaining a solution
b2) applying the solution onto said outer longitudinal surface,
c) curing the solution applied in step b) thereby obtaining a charge roller.

A grinding step can be performed for example between steps a3) and step b2). An inspecting step can be performed after step c).

Preferably, the steps of the method are carried out in the order in which they are presented.

Any curing step may be carried out in ovens.

Step b) of b2) as defined above can be performed through any suitable manner such as using atomization spraying. In this embodiment, the shaft with the layer disposed about it is fixed either horizontally or vertically and made to rotate along its longitudinal axis while spraying gun moves along the longitudinal side thereon. Solvent is added to a first composition to dissolve its components, assist spraying and coating. Solvent also serves as a carrier to wet and level coating once sprayed on the roller surface.

An example of a solvent suitable in the context of a method as defined above is paint thinner Chemglaze® 9951 available from LORD Corporation. This solvent is a mixture of xylene (more than 0% and less than 50% by weight over the weight of the mixture), 1-MeO-2-propyl-acetate (more than 0% and less than 40% by weight over the weight of the mixture), ethyl benzene (more than 0% and less than 15% by weight over the weight of the mixture) and dipropyleneglycol methyletheracetate (more than 0% and less than 10% by weight over the weight of the mixture).

An example of a solution comprising a first composition as defined above and a solvent is as follows:

4,4'-methylene diphenyl diisocyanate (Mondur® MR Light) in an amount of about 1.85 g a linear aliphatic polycarbonate polyester polyol which is obtainable by reacting hexane diol-1,6 with epsilon-caprolactone, having an equivalent weight of about 2000 and an hydroxyl value of about 1.7% w/w as measured with DIN 53 240/2 (Desmophen® C1200), in an amount of about 10.0 g Lithium bis(trifluoromethanesulfonyl)imide (HQ® 115), in an amount of about 0.12 g a wax treated fumed silica having an average particle size ($d_{50}$) of about 4.4 microns (Acematt® 607), in an amount of about 0.81 g a fluorinated polyol (NRL Fluoropolyol) in an amount of about 0.75 g solvent (Chemglaze® 9951) in an amount of about 20.15 g.

Charge rollers as presently disclosed passed printing quality test beyond one million impressions. Neither physical wear nor contamination was observed on the roller surface. Charge rollers as presently disclosed are also cost-effective, especially if hydrin is used as layer of conductive rubber. The combination of performance maintenance and extended life span has led to a significant Cpp (coat per page) reduction.

Further embodiments and advantages of the present invention will become apparent to a skilled reader in light of the examples provided below.

Example

Below, the preparation of a charge roller coating solution according to an embodiment of the present disclosure is disclosed:

| Component | Weight (g) | % |
|---|---|---|
| Desmophen C1200 | 10.00 | 29.69 |
| Mondur_MR Light | 1.85 | 5.50 |
| HQ115 | 0.12 | 0.35 |
| ACEMATT 607 | 0.81 | 2.40 |

-continued

| Component | Weight (g) | % |
|---|---|---|
| NRL Fluoropolyol | 0.75 | 2.23 |
| Sub Total | 13.53 | 40.17 |
| Chemglaze 9951 | 20.15 | 59.83 |
| Total | 33.68 | |
| % Silica (based on solids) | | 5.99 |
| % Fluoropolyol (based on solids) | | 5.54 |

Mixing Instructions:
1. Desmophen C1200, NRL Fluoropolyol, Chemglaze 9951, HQ115 and ACEMATT 607 were added in a wide mouth jar in the order arranged
2. The lid was closed tight and the jar placed in a High Speed mixer at high RPM mixing for 5 minutes
3. Mondur MR Light was added to the mixture
4. The jar was put back to the mixer, and the mixture was mixed for 3 minutes at medium RPM
5. The coating solution was sprayed when homogenous and bubble free.

The invention claimed is:

1. A charge roller for a liquid electro-photographic image-forming apparatus, comprising an inner conductive shaft, a conductive rubber layer on the inner conductive shaft, and a coating on the conductive rubber layer, said coating being obtained by curing a first composition comprising:
   an aromatic diisocyanate,
   a polycarbonate polyester polyol,
   a matte agent,
   a surface energy modifier consisting of an epoxy-functionalized fluorinated polyol, and
   a conductive agent,
wherein the coating has a conductivity that is lower than a conductivity of the conductive rubber layer.

2. The roller according to claim 1, wherein the diisocyanate and polycarbonate polyester polyol are present in the composition in amounts which give a NCO/OH equivalent ratio of 1.3.

3. The roller according to claim 1, wherein the diisocyanate comprises polymeric 4,4'-methylene diphenyl diisocyanate.

4. The roller according to claim 1, wherein the polycarbonate polyester polyol comprises a linear aliphatic polycarbonate polyol which is obtained from a mixture comprising 1,6-hexanediol and ε-caprolactone, having an equivalent weight of 2000 and an hydroxyl value of 1.7% w/w as measured with DIN 53 240/2.

5. The roller according to claim 1, wherein the matte agent comprises a wax surface-treated fumed silica or siloxane treated silica having an average volume particle size ($d_{50}$) between 4.4 and 5 microns.

6. The roller according to claim 1, wherein the conductive agent comprises at least one of a lithium salt and a quaternary alkyl ammonium salt.

7. The roller according to claim 1, wherein the coating has a thickness between 4 and 8 microns.

8. The roller according to claim 1, wherein the conductive rubber layer is obtained by curing a second composition comprising:
   a terpolymer of epichlorohydrin/ethylene oxide/allyl glycidyl ether,
   a lithium salt, and
   carbon black,
wherein said conductive rubber layer has an impendence at 8 KHz between 10 and 20 KΩ and a DC resistance between 30 and 50 KΩ when both impendence and resistance are measured by using an electrode of 323 mm long and 2 mm wide and an electrical source of 100V, in a rubber roller stabilized at 50% relative humidity and 23° C.

9. The roller according to claim 8, wherein the second composition further comprises a sulfur donor, a curing activator and a curing accelerator.

10. An apparatus for forming an image through a liquid electro-photograph process, said apparatus comprising said charge roller as defined in claim 1.

11. The roller according to claim 1, wherein the charge roller has a measured gloss of about 3 to 5 units at an 80 degree light angle.

12. A charge roller for a liquid electro-photographic image-forming apparatus, comprising an inner conductive shaft, a conductive layer on the inner conductive shaft, and a coating on the conductive layer, said coating comprising a rubber which is obtained by curing a first composition comprising:
   a polymeric 4,4'-methylene diphenyl diisocyanate,
   a linear aliphatic polycarbonate polyester polyol which is obtainable from a mixture comprising 1,6-hexanediol and ε-caprolactone, said polyol having an equivalent weight of 2000 and an hydroxyl value of 1.7% w/w as measured with DIN 53 240/2,
   a surface-treated silica,
   a fluorinated polyol consisting of an epoxy-functionalized fluorinated polyol, and
   lithium bis(trifluoromethanesulfonyl)imide,
wherein the coating has a conductivity that is lower than a conductivity of the conductive layer.

13. The roller according to claim 12, wherein the coating has a thickness between 4 and 8 microns.

14. The roller according to claim 12, wherein the conductive layer is obtained by curing a second composition comprising:
   a terpolymer of epichlorohydrin/ethylene oxide/allyl glycidyl ether,
   a lithium salt, and
   carbon black,
wherein said conductive layer has an impendence at 8 KHz between 10 and 20 KΩ and a DC resistance between 30 and 50 KΩ when both impendence and resistance are measured by using an electrode of 323 mm long and 2 mm wide and an electrical source of 100V, in a rubber roller stabilized at 50% relative humidity and 23° C.

15. The roller according to claim 14, wherein the second composition further comprises a sulfur donor, a curing activator and a curing accelerator.

16. The roller according to claim 12, wherein the charge roller has a measured gloss of about 3 to 5 units at an 80 degree light angle.

17. A method for the manufacture of said charge roller according to claim 1, said method comprising the step of curing the first composition as defined in claim 1, and wherein said curing comprises subjecting said first composition to a temperature between 70 and 130° C., for a time between 30 min and 2 hours.

18. The method according to claim 17, which comprises the steps of:
   a) providing said inner conductive shaft, said layer comprising said conductive rubber, said layer being disposed about said shaft and extending along at least a portion of the length of said shaft, said layer further having an outer longitudinal surface,
   b) applying said first composition onto said outer longitudinal surface, c) curing the composition applied in step b) thereby obtaining said charge roller.

* * * * *